US008739159B2

United States Patent
Lin et al.

(10) Patent No.: US 8,739,159 B2
(45) Date of Patent: *May 27, 2014

(54) CACHE PARTITIONING WITH A PARTITION TABLE TO EFFECT ALLOCATION OF SHARED CACHE TO VIRTUAL MACHINES IN VIRTUALIZED ENVIRONMENTS

(75) Inventors: Jiang Lin, Austin, TX (US); Lixin Zhang, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/444,439

(22) Filed: Apr. 11, 2012

(65) Prior Publication Data

US 2012/0198172 A1     Aug. 2, 2012

Related U.S. Application Data

(63) Continuation of application No. 12/546,791, filed on Aug. 25, 2009.

(51) Int. Cl.
*G06F 9/455* (2006.01)
*G06F 12/00* (2006.01)
*G06F 12/08* (2006.01)

(52) U.S. Cl.
CPC ............. *G06F 9/455* (2013.01); *G06F 12/084* (2013.01); *G06F 12/0848* (2013.01)
USPC ................................ 718/1; 711/129; 711/130

(58) Field of Classification Search
None
See application file for complete search history.

(56) References Cited

U.S. PATENT DOCUMENTS 5,353,425 A   10/1994   Malamy et al.
5,684,976 A   11/1997   Soheili-Arasi et al.
(Continued)

FOREIGN PATENT DOCUMENTS

CN   1499381 A   5/2004
CN   1728112 A   2/2006
(Continued)

OTHER PUBLICATIONS

International Search Report and Written Opinion dated Dec. 7, 2010 for International Application No. PCT/EP2010/062077, 9 pages.

(Continued)

*Primary Examiner* — Abdullah Al Kawsar
*Assistant Examiner* — Tammy Lee
(74) *Attorney, Agent, or Firm* — Stephen R. Tkacs; Stephen J. Walder, Jr.; John D. Flynn (57) ABSTRACT

A mechanism is provided in a virtual machine monitor for providing cache partitioning in virtualized environments. The mechanism assigns a virtual identification (ID) to each virtual machine in the virtualized environment. The processing core stores the virtual ID of the virtual machine in a special register. The mechanism also creates an entry for the virtual machine in a partition table. The mechanism may partition a shared cache using a vertical (way) partition and/or a horizontal partition. The entry in the partition table includes a vertical partition control and a horizontal partition control. For each cache access, the virtual machine passes the virtual ID along with the address to the shared cache. If the cache access results in a miss, the shared cache uses the partition table to select a victim cache line for replacement.

8 Claims, 4 Drawing Sheets

(56) References Cited

U.S. PATENT DOCUMENTS

| | | | |
|---|---|---|---|
| 5,898,849 | A | 4/1999 | Tran |
| 6,122,709 | A | 9/2000 | Wicki et al. |
| 6,493,800 | B1 | 12/2002 | Blumrich |
| 6,996,676 | B2 | 2/2006 | Megiddo et al. |
| 7,415,575 | B1 | 8/2008 | Tong et al. |
| 7,546,147 | B2 | 6/2009 | Jitsuishi et al. |
| 7,774,549 | B2 | 8/2010 | Vishin |
| 7,856,633 | B1 | 12/2010 | Lee et al. |
| 8,087,024 | B2 | 12/2011 | Lakshmanamurthy et al. |
| 8,176,282 | B2 | 5/2012 | Bouvier |
| 2002/0002657 | A1 | 1/2002 | Sturges et al. |
| 2003/0154345 | A1 | 8/2003 | Lyon |
| 2003/0196066 | A1 | 10/2003 | Mathews |
| 2005/0132364 | A1 | 6/2005 | Tewari et al. |
| 2005/0210108 | A1 | 9/2005 | Covert et al. |
| 2006/0004963 | A1 | 1/2006 | Mattina et al. |
| 2006/0095680 | A1 | 5/2006 | Park et al. |
| 2006/0136667 | A1 | 6/2006 | Shultz et al. |
| 2006/0143388 | A1 | 6/2006 | Wintergerst et al. |
| 2007/0005906 | A1 | 1/2007 | Miyamoto |
| 2007/0204121 | A1 | 8/2007 | O'Connor et al. |
| 2007/0214456 | A1 | 9/2007 | Casey et al. |
| 2007/0260819 | A1 | 11/2007 | Gao et al. |
| 2007/0266207 | A1* | 11/2007 | Moyer .................. 711/128 |
| 2008/0010413 | A1 | 1/2008 | Kailas et al. |
| 2008/0022040 | A1 | 1/2008 | Joukan et al. |
| 2008/0034162 | A1 | 2/2008 | Sturges et al. |
| 2008/0147990 | A1 | 6/2008 | Pesavento et al. |
| 2008/0148241 | A1 | 6/2008 | Jones et al. |
| 2008/0177974 | A1 | 7/2008 | Chiang et al. |
| 2008/0215824 | A1 | 9/2008 | Goodman et al. |
| 2008/0270705 | A1* | 10/2008 | Kailas et al. .................. 711/129 |
| 2008/0288942 | A1 | 11/2008 | Barsness et al. |
| 2009/0300631 | A1 | 12/2009 | Karlapalem et al. |
| 2010/0037097 | A1* | 2/2010 | Kobayashi et al. .............. 714/19 |
| 2010/0318742 | A1 | 12/2010 | Plondke et al. |
| 2011/0022773 | A1 | 1/2011 | Rajamony et al. |
| 2011/0055827 | A1 | 3/2011 | Lin et al. |

FOREIGN PATENT DOCUMENTS

| | | |
|---|---|---|
| CN | 1790294 A | 6/2006 |
| CN | 101122886 A | 2/2008 |
| WO | WO2006/082554 A2 | 8/2006 |

OTHER PUBLICATIONS

USPTO U.S. Appl. No. 12/509,752, 2 pages.
USPTO U.S. Appl. No. 12/546,791, 1 page.
Kessler, R. E. et al., "Page Placement Algorithms for Large Real-Indexed Caches", ACM Transactions on Computer Systems, vol. 10, No. 4, Nov. 1992, pp. 338-359.
Lin, Jiang et al., "Gaining Insights into Multicore Cache Partitioning: Bridging the Gap between Simulation and Real Systems", 14th International Symposium on High-Performance Computer Architecture (HPCA), 2008, pp. 367-378.
Nesbit, Kyle J. et al., "Virtual Private Caches", Proceedings of the 34th Annual International Symposium on Computer Architecture (ISCA'07), San Diego, California, Jun. 9-13, 2007, pp. 57-68.
Qureshi, Moinuddin K. et al., "Utility-Based Cache Partitioning: A Low-Overhead, High-Performance, Runtime Mechanism to Partition Shared Caches", Proceeding of the 39th Annual IEEE/ACM International Symposium on Microarchitecture, 2006, pp. 423-432.
Rothman, Jeffrey B. et al., "Sector Cache Design and Performance", Proceedings of MASCOTS 2000, Jan. 1999, 63 pages.
Suh, G. E. et al., "Dynamic Cache Partitioning for Simultaneous Multithreading Systems", Proceedings of the IASTED International Conference on Parallel and Distributed Computing and Systems (PDCS'01), Anaheim, California, Aug. 2001, pp. 635-641.
Final Office Action mailed Apr. 30, 2012 for U.S. Appl. No. 12/509,752; 18 pages.
Office Action mailed May 22, 2012 for U.S. Appl. No. 12/546,791; 18 pages.
Preliminary Amendment filed Apr. 12, 2012 for U.S. Appl. No. 12/546,791; 7 pages.
Response to Final Office Action filed Jul. 27, 2012, U.S. Appl. No. 12/509,752, 12 pages.
Response to Office Action filed Aug. 16, 2012, U.S. Appl. No. 12/546,791, 14 pages.
Notice of Allowance mailed May 17, 2013 for U.S. Appl. No. 12/509,752, 10 pages.
Final Office Action dated Nov. 6, 2012 for U.S. Appl. No. 12/546,791; 19 pages.
Interview Summary mailed Dec. 21, 2012 for U.S. Appl. No. 12/546,791; 3 pages.
Response to Final Office Action filed Jan. 16, 2013, U.S. Appl. No. 12/546,791, 12 pages.
Notice of Allowance mailed Jan. 24, 2014 for U.S. Appl. No. 12/546,791, 16 pages.

* cited by examiner

CACHE PARTITIONING WITH A PARTITION TABLE TO EFFECT ALLOCATION OF SHARED CACHE TO VIRTUAL MACHINES IN VIRTUALIZED ENVIRONMENTS

This application is a continuation of application Ser. No. 12/546,791, filed Aug. 25, 2009, status pending.

BACKGROUND

The present application relates generally to an improved data processing apparatus and method and more specifically to an apparatus and method for providing an improved reconfigurable cache.

A cache is used to speed up data transfer and may be either temporary or permanent. Memory caches are in every computer to speed up instruction execution and data retrieval and updating. These temporary caches serve as staging areas, and their contents are constantly changing. A memory cache, or "CPU cache," is a memory bank that bridges main memory and the central processing unit (CPU). A memory cache is faster than main memory and allows instructions to be executed and data to be read and written at higher speed. Instructions and data are transferred from main memory to the cache in fixed blocks, known as cache "lines."

A virtual machine is an instance of an operating system along with one or more applications running in an isolated partition within a computer system. A virtual machine monitor enables different operating systems to run in the same computer at the same time and prevents applications from interfering with each other. This differs from a dual-boot or multi-boot environment, in which the user has to choose only one operating system at startup.

Each virtual machine is like a machine within the machine and functions as if it owns the entire computer. The operating systems in each virtual machine partition may be referred to as "guest operating systems," and they communicate with the hardware via the virtual machine monitor (VMM). The VMM "virtualizes" the hardware, such as processors, memory, input/output (I/O) adapters, and other resources, for each virtual machine.

Using virtualization, multiple operating systems can run in the same server, eliminating the need to dedicate a single machine to one application. Old and new applications can run simultaneously with their respective operating systems in multiple core servers with many threads of execution, saving space and power consumption. New versions of an operating system and new applications can be deployed without purchasing new hardware.

SUMMARY

In one illustrative embodiment, a method, in a data processing system, is provided for partitioning a shared cache in virtualized environments. The method comprises assigning a virtual identifier to a virtual machine and creating an entry for the virtual machine in a partition table. The entry comprises a vertical partition control and a horizontal partition control. The method further comprises receiving a cache access request from the virtual machine and responsive to the cache access request resulting in a cache miss, writing to the shared cache based on the vertical partition control and the horizontal partition control in the entry in the partition table corresponding to the virtual machine.

In other illustrative embodiments, a computer program product comprising a computer useable or readable medium having a computer readable program is provided. The computer readable program, when executed on a computing device, causes the computing device to perform various ones, and combinations of, the operations outlined above with regard to the method illustrative embodiment.

In yet another illustrative embodiment, an apparatus is provided for partitioning a shared cache in virtualized environments. The apparatus comprises a shared cache array and a shared cache controller. The shared cache controller is configured to receive a cache access request from a virtual machine and responsive to the cache access request resulting in a cache miss, write to the shared cache array based on a vertical partition control and a horizontal partition control in an entry in a partition table corresponding to the virtual machine.

These and other features and advantages of the present invention will be described in, or will become apparent to those of ordinary skill in the art in view of, the following detailed description of the example embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

The illustrative embodiments provide a mechanism in a virtual machine monitor for providing cache partitioning in virtualized environments. The mechanism assigns a virtual identification (ID) to each virtual machine in the virtualized environment. The processing core stores the virtual ID of the virtual machine in a special register. The mechanism also creates an entry for the virtual machine in a partition table.

The mechanism may partition a shared cache using a vertical (way) partition and/or a horizontal partition. The entry in the partition table includes a vertical partition control and a horizontal partition control. In accordance with an exemplary embodiment, for an 8-way cache, the vertical partition control comprises an 8-bit mask. In accordance with an exemplary embodiment, the horizontal partition control comprises a 4-bit mask and a 4-bit offset. The 4-bit mask determines a number of partitions, and the 4-bit offset determines the first position (row).

For each cache access, the virtual machine passes the virtual ID along with the address to the shared cache. If the cache access results in a miss, the shared cache uses the partition table to select a victim cache line for replacement.

Figure 1:
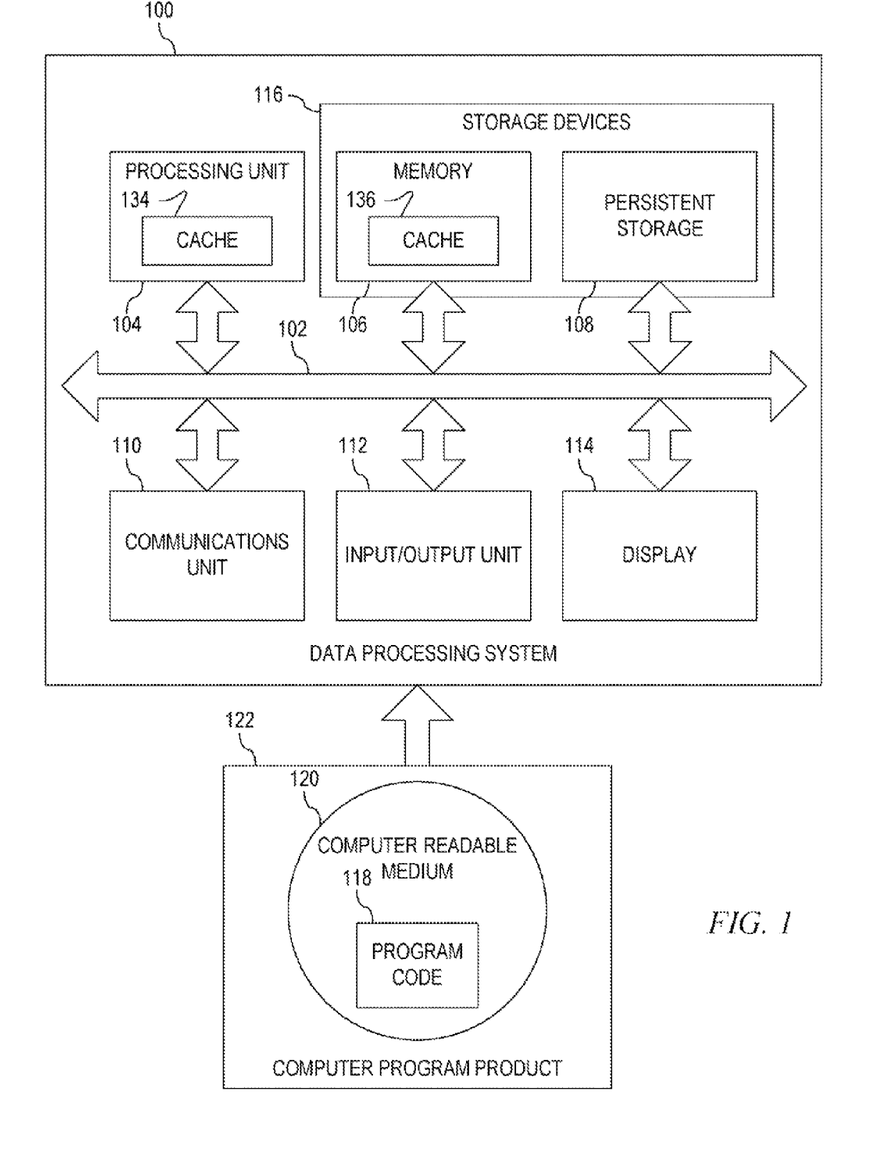
FIG. 1 is a block diagram of a data processing system in which aspects of the illustrative embodiments may be implemented.
Figure 2:
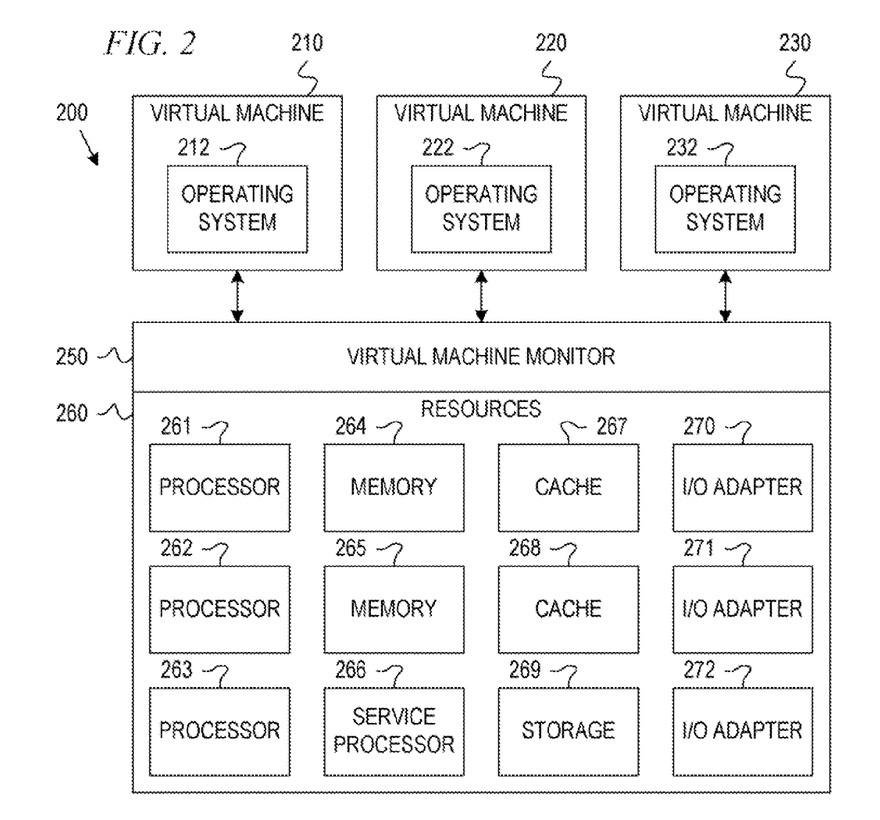
FIG. 2 is a block diagram of an example virtualized environment in which aspects of the illustrative embodiments may be implemented.

Thus, the illustrative embodiments may be utilized in many different types of data processing environments including a distributed data processing environment, a single data processing device, or the like. In order to provide a context for the description of the specific elements and functionality of the illustrative embodiments, FIGS. 1 and 2 are provided hereafter as example environments in which aspects of the illustrative embodiments may be implemented. While the description following FIGS. 1 and 2 will focus primarily on a single data processing device implementation, this is only an example and is not intended to state or imply any limitation with regard to the features of the present invention. To the contrary, the illustrative embodiments are intended to include distributed data processing environments.

With reference now to the figures and in particular with reference to FIGS. 1 and 2, example diagrams of data processing environments are provided in which illustrative embodiments of the present invention may be implemented. It should be appreciated that FIGS. 1 and 2 are only examples and are not intended to assert or imply any limitation with regard to the environments in which aspects or embodiments of the present invention may be implemented. Many modifications to the depicted environments may be made without departing from the spirit and scope of the present invention.

With reference now to the figures, FIG. 1 is a block diagram of a data processing system in which aspects of the illustrative embodiments may be implemented. Data processing system 100 is an example of a computer, in which computer usable program code or instructions implementing the processes may be located for the illustrative embodiments. In this illustrative example, data processing system 100 includes communications fabric 102, which provides communications between processor unit 104, memory 106, persistent storage 108, communications unit 110, input/output (I/O) unit 112, and display 114.

Processor unit 104 serves to execute instructions for software that may be loaded into memory 106. Processor unit 104 may be a set of one or more processors or may be a multi-processor core, depending on the particular implementation. Further, processor unit 104 may be implemented using one or more heterogeneous processor systems in which a main processor is present with secondary processors on a single chip. As another illustrative example, processor unit 104 may be a symmetric multi-processor system containing multiple processors of the same type.

Memory 106 and persistent storage 108 are examples of storage devices 116. A storage device is any piece of hardware that is capable of storing information, such as, for example, without limitation, data, program code in functional form, and/or other suitable information either on a temporary basis and/or a permanent basis. Memory 106, in these examples, may be, for example, a random access memory or any other suitable volatile or non-volatile storage device. Persistent storage 108 may take various forms depending on the particular implementation. For example, persistent storage 108 may contain one or more components or devices. For example, persistent storage 108 may be a hard drive, a flash memory, a rewritable optical disk, a rewritable magnetic tape, or some combination of the above. The media used by persistent storage 108 also may be removable. For example, a removable hard drive may be used for persistent storage 108.

Processing unit 104 may have cache 134. Cache 134 may be a level 0 (L0) and/or level 1 (L1) cache. Memory 106 may have cache 136, which may be, for example, a level 2 (L2) cache or level 3 (L3) cache. Memory 106 may be a shared memory that is shared among a plurality of threads or a plurality of processing units. Therefore, cache 136 may be a shared cache.

Communications unit 110, in these examples, provides for communications with other data processing systems or devices. In these examples, communications unit 110 is a network interface card. Communications unit 110 may provide communications through the use of either or both physical and wireless communications links.

Input/output unit 112 allows for input and output of data with other devices that may be connected to data processing system 100. For example, input/output unit 112 may provide a connection for user input through a keyboard, a mouse, and/or some other suitable input device. Further, input/output unit 112 may send output to a printer. Display 114 provides a mechanism to display information to a user.

Instructions for the operating system, applications and/or programs may be located in storage devices 116, which are in communication with processor unit 104 through communications fabric 102. In these illustrative examples the instruction are in a functional form on persistent storage 108. These instructions may be loaded into memory 106 for execution by processor unit 104. The processes of the different embodiments may be performed by processor unit 104 using computer implemented instructions, which may be located in a memory, such as memory 106.

These instructions are referred to as program code, computer usable program code, or computer readable program code that may be read and executed by a processor in processor unit 104. The program code in the different embodiments may be embodied on different physical or tangible computer readable media, such as memory 106 or persistent storage 108.

Program code 118 is located in a functional form on computer readable medium 120 that is selectively removable and may be loaded onto or transferred to data processing system 100 for execution by processor unit 104. Program code 118 and computer readable medium 120 form computer program product 122 in these examples. In one example, computer readable medium 120 may be in a tangible form, such as, for example, an optical or magnetic disc that is inserted or placed into a drive or other device that is part of persistent storage 108 for transfer onto a storage device, such as a hard drive that is part of persistent storage 108. In a tangible form, computer readable medium 120 also may take the form of a persistent storage, such as a hard drive, a thumb drive, or a flash memory that is connected to data processing system 100. The tangible form of computer readable medium 120 is also referred to as a computer recordable storage medium. In some instances, computer readable medium 120 may not be removable.

Alternatively, program code 118 may be transferred to data processing system 100 from computer readable medium 120 through a communications link to communications unit 110 and/or through a connection to input/output unit 112. The communications link and/or the connection may be physical or wireless in the illustrative examples. The computer readable media also may take the form of non-tangible media, such as communications links or wireless transmissions containing the program code.

In some illustrative embodiments, program code 118 may be downloaded over a network to persistent storage 108 from another device or data processing system for use within data processing system 100. For instance, program code stored in a computer readable storage medium in a server data processing system may be downloaded over a network from the server to data processing system 100. The data processing system providing program code 118 may be a server computer, a client computer, or some other device capable of storing and transmitting program code 118.

The different components illustrated for data processing system 100 are not meant to provide architectural limitations to the manner in which different embodiments may be implemented. The different illustrative embodiments may be implemented in a data processing system including components in addition to or in place of those illustrated for data processing system 100. Other components shown in FIG. 1 cart be varied from the illustrative examples shown. The different embodiments may be implemented using any hardware device or system capable of executing program code. As one example, the data processing system may include organic components integrated with inorganic components and/or may be comprised entirely of organic components excluding a human being. For example, a storage device may be comprised of an organic semiconductor.

As another example, a storage device in data processing system 100 is any hardware apparatus that may store data. Memory 106, persistent storage 108 and computer readable medium 120 are examples of storage devices in a tangible form.

In another example, a bus system may be used to implement communications fabric 102 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 106 or a cache such as found in an interface and memory controller hub that may be present in communications fabric 102.

FIG. 2 is a block diagram of an example virtualized environment in which aspects of the illustrative embodiments may be implemented. The hardware in virtualized environment 200 may be implemented as, for example, data processing system 100 in FIG. 1. Virtualized environment 200 includes virtual machines 210, 220, and 230, virtual machine monitor 250, and resources 260. Operating systems 212, 222, and 232 execute within virtual machines 210, 220, and 230, respectively. Operating systems 212, 222, and 232 may be multiple copies of a single operating system or multiple heterogeneous operating systems simultaneously run within virtualized environment 200.

Virtual machine monitor 250 allocates resources 260 to virtual machines 210, 220, and 230. Resources 260 may include, for example, processors 261-263, memory 264 and 265, service processor 266, cache 267 and 268, storage 269, and I/O adapters 270-272. For example, virtual machine monitor 250 may assign a "virtual processor" to each virtual machine, which appears a single processor from the perspective of the virtual machine. A virtual processor may be a thread of a multi-threaded processor core, a processor core, a plurality of processor cores, a multiple core processor, or a plurality of processors.

Virtual machine monitor 250 performs a number of functions and services for virtual machines 210, 220, and 230 to create and enforce the partitioning of virtualized environment 200. Virtual machine monitor 250 may be software or firmware running on service processor 266, for example. Hypervisor software is an example of server firmware available from International Business Machines Corporation. Firmware is "software" stored in a memory chip that holds its content without electrical power, such as, for example, read-only memory (ROM), programmable ROM (PROM), erasable programmable ROM (EPROM), electrically erasable programmable ROM (EEPROM), and nonvolatile random access memory (nonvolatile RAM). Thus, virtual machine monitor 250 allows the simultaneous execution of independent operating system images 212, 222, and 232 by virtualizing all hardware resources of virtualized environment 200.

More particularly, resources 260 include cache 267 and cache 268. Therefore, cache 267 and cache 268 may be shared caches. Virtualized environments may require performance guarantees. For example, for a virtual machine to meet a performance target, the virtual machine may require a certain amount of cache. Therefore, the cache may be partitioned using cache coloring or way partitioning. However, interference in shared caches may be at odds with performance guarantees.

In accordance with an illustrative embodiment, a mechanism is provided in virtual machine monitor 250 for providing cache partitioning in virtualized environment 200. The mechanism assigns a virtual identification (ID) to each virtual machine 210, 220, and 230 in virtualized environment 200. The mechanism creates an entry for the virtual machine in a partition table. The mechanism may partition a shared cache using a vertical (way) partition and/or a horizontal partition. The entry in the partition table includes a vertical partition control and a horizontal partition control.

Figure 3:
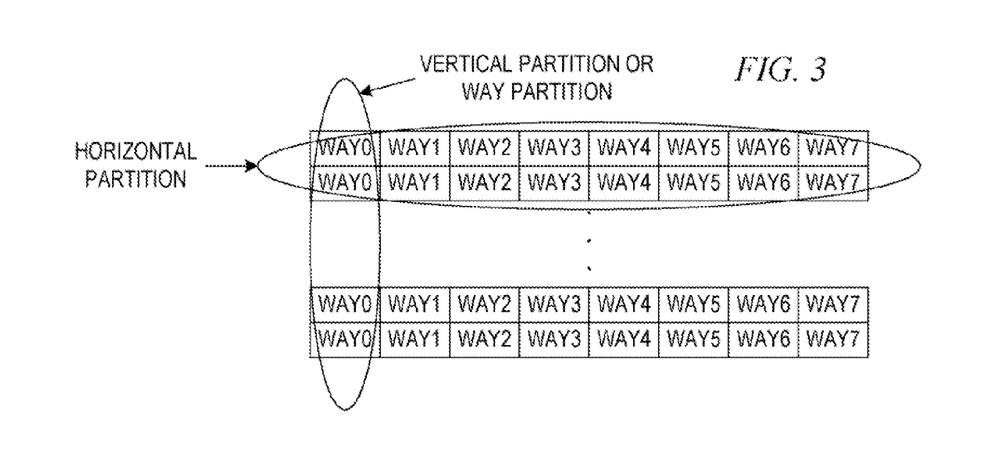
FIG. 3 depicts vertical and horizontal partitioning of a shared cache in accordance with an illustrative embodiment.

FIG. 3 depicts vertical and horizontal partitioning of a shared cache in accordance with an illustrative embodiment. In the depicted example, the shared cache is an 8-way cache; thus, vertical partitioning may also be referred to as "way partitioning." That is, in a vertical partition, the virtual machine monitor may assign a virtual machine one or more columns, or ways, of the shared cache. In the depicted example, each row of the shared cache may be referred to as a "set" or "congruence class." Thus, in a horizontal partition, the virtual machine monitor may assign a virtual machine one or more rows, or sets, of the shared cache.

Figure 4:
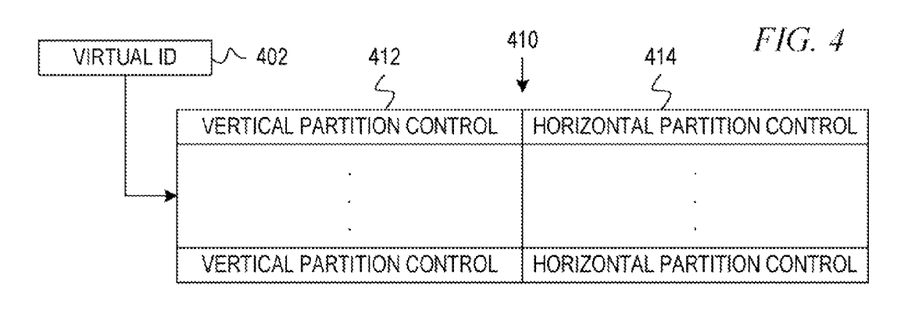
FIG. 4 is a block diagram illustrating a partition table for cache partitioning in a virtualized environment in accordance with an illustrative embodiment.

FIG. 4 is a block diagram illustrating a partition table for cache partitioning in a virtualized environment in accordance with an illustrative embodiment. The virtual machine monitor assigns a virtual ID 402 to a virtual machine. The virtual ID 402 is an index to the partition table 410. The virtual machine monitor also creates an entry in partition table 410 for the virtual machine, indexed by virtual ID 402. Each entry in partition table 410 comprises a vertical partition control 412 and/or a horizontal partition control 414.

A processor core allocated to the virtual machine stores the virtual ID 402 in a special register. Virtual ID 402 is a part of the architecture state of the virtual machine; therefore, virtual ID 402 is saved during virtual machine switches. The virtual machine passes its virtual ID 402 to shared caches along with addresses. If a cache access results in a cache miss, the shared cache uses virtual ID 402 and partition table 410 to select a victim line.

Figure 5:
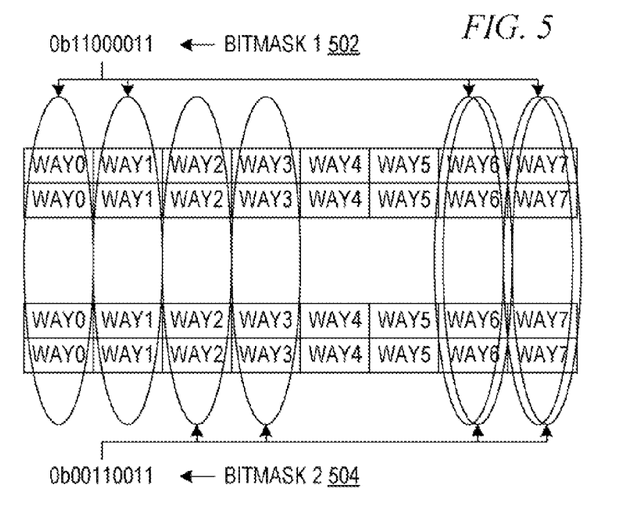
FIG. 5 illustrates vertical partitioning of a shared cache in a virtualized environment in accordance with an illustrative embodiment.

FIG. 5 illustrates vertical partitioning of a shared cache in a virtualized environment in accordance with an illustrative embodiment. A vertical partition control may comprise a bitmask with no more than one bit for each way of the shared cache. For example, for an 8-way cache, the vertical partition control would comprise an 8-bit mask. Bitmask 1 502 for a first virtual machine may be "0b11000011," which indicates that the first virtual machine is to use way0, way1, way6, and way7. Bitmask 2 504 for a second virtual machine may be "0b00110011," which indicates that the second virtual machine is to use way2, way3, way6, and way7. Therefore, in the above example, the virtual machines have two private vertical partitions, way0 and way1 for the first virtual machine and way2 and way3 for the second virtual machine, and two shared virtual partitions, way6 and way7.

Figure 6:
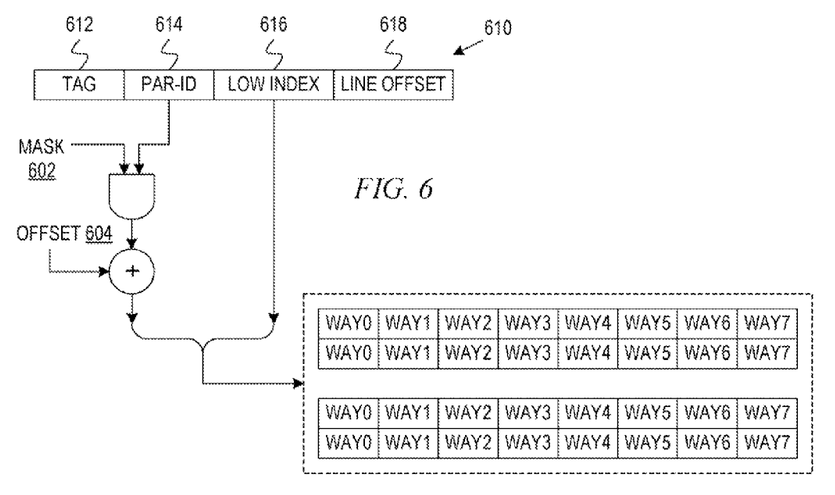
FIG. 6 illustrates horizontal partitioning of a shared cache in a virtualized environment in accordance with an illustrative embodiment.

FIG. 6 illustrates horizontal partitioning of a shared cache in a virtualized environment in accordance with an illustrative embodiment. A horizontal partition control may comprise a mask and a partition offset. Assuming sixteen horizontal partitions, the horizontal partition control may comprise a 4-bit mask and a 4-bit offset. The number of horizontal partitions is two to the power of the number of bits in the mask, in this case $2^4$ or sixteen. Thus, the horizontal partitions are partition 0 to partition 15.

The mask indicates what relative positions the virtual machine may use. In other words, the mask indicates how many partitions to use. The offset indicates where the first position is. Therefore, a mask of "0b0000" and an offset of "0b0001" indicates that a virtual machine uses partition 1. As another example, a mask of "0b0001" and an offset of "0b0010" indicates that a virtual machine uses partition 2 and partition 3.

A given address 610 comprises tag 612, partition ID 614, low index 616, and line offset 618. The partition ID 614 has the same number of hits as the mask 602. The result of the partition ID 614 AND the mask is the position of the first horizontal partition that this virtual machine may use. That result plus the offset 604 points to the corresponding position with the given address 610. The low index 616 is the index to the position of the corresponding row within the selected row.

After the corresponding row or congruence set is selected, the vertical partition information is used to select a victim line in the row. The vertical partition information may be used to extend known replacement policies. For example, a common replacement policy is to replace the least recently used (LRU) cache line. The LRU policy may be extended to select the LRU line stored in the vertical partitions that this virtual machine may use. If the bitmask 2 502 for a virtual machine is "0b00110011", the LRU line from way2, way3, way6, and way7 is selected as the victim line.

The number of vertical partitions must be less than or equal to the associativity (the size of each row). Each virtual machine must use a power of two number of horizontal partitions. Unused private partitions are not readily useable by other virtual machines.

In an alternative embodiment, partition information may be considered as a hint. In other words, a virtual machine may use the vertical and/or horizontal partitions allocated by the virtual machine monitor in the partition table, but may decide not to follow the allocated partitions. In one example embodiment, a virtual machine could choose unused lines before considering the allocated partitions in the partition table.

As will be appreciated by one skilled in the art, the present invention may be embodied as a system, method, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Any combination of one or more computer usable or computer readable medium(s) may be utilized. The computer-usable or computer-readable medium may be, for example, but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory). an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, radio frequency (RF), etc.

Computer program code for carrying out operations of the present invention may be written in any combination of one or more programming languages, including an object oriented programming language such as Java™, Smalltalk™, C++ or the like and conventional procedural programming languages, such as the programming language or similar programming languages. The program code may execute entirely on the user's computer, partly on the user's computer, as a stand-alone software package, partly on the user's computer and partly on a remote computer or entirely on the remote computer or server in the latter scenario, the remote computer may be connected to the user's computer through any type of network, including a local area network (LAN) or a wide area network (WAN), or the connection may be made to an external computer (for example, through the Internet using art Internet Service Provider). In addition, the program code may be embodied on a computer readable storage medium on the server or the remote computer and downloaded over a network to a computer readable storage medium of the remote computer or the users' computer for storage and/or execution. Moreover, any of the computing systems or data processing systems may store the program code in a computer readable storage medium after having downloaded the program code over a network from a remote computing system or data processing system.

The illustrative embodiments are described below with reference to flowchart illustrations and/or block diagrams of methods, apparatus (systems) and computer program products according to the illustrative embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 7:
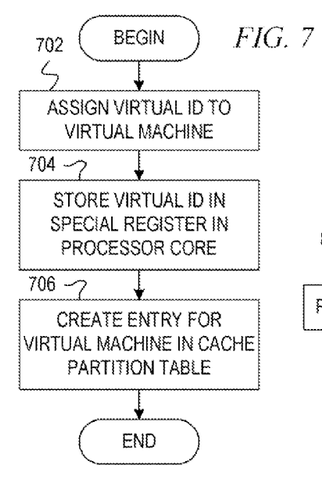
FIG. 7 is a flowchart illustrating operation of a virtual machine monitor for cache partitioning in a virtualized environment in accordance with an illustrative embodiment.

FIG. 7 is a flowchart illustrating operation of a virtual machine monitor for cache partitioning in a virtualized environment in accordance with an illustrative embodiment. Operation begins when a new virtual machine is activated, and the virtual machine monitor assigns a virtual ID to the virtual machine (block 702). The processing core allocated to the virtual machine stores the virtual ID in a special register (block 704). The virtual machine monitor then creates an entry for the virtual machine in a cache partition table (block 706). Thereafter, operation ends.

Figure 8:
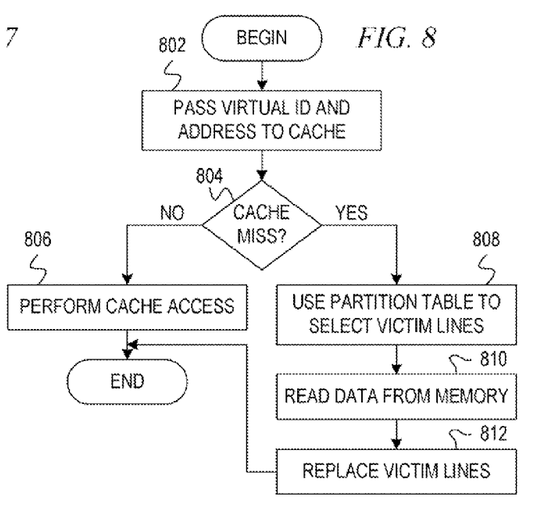
FIG. 8 is a flowchart illustrating operation of a shared cache in a virtualized environment in accordance with an illustrative embodiment.

FIG. 8 is a flowchart illustrating operation of a shared cache in a virtualized environment in accordance with an illustrative embodiment. Operation begins when a virtual machine performs a cache access to a shared cache in a virtualized environment, and the virtual machine passes the virtual ID and address to the cache (block 802). The cache determines whether the cache access results in a cache miss (block 804). If the cache access does not result in a cache miss, then the cache performs the cache access (block 806), and operation ends. If the cache access results in a cache miss in block 804, then the cache uses the partition table to select victim lines (block 808), reads data from memory (block 810), and replaces the victim lines (block 812). Thereafter, operation ends.

Thus, the illustrative embodiments provide mechanisms in a virtual machine monitor for providing cache partitioning in virtualized environments. The mechanism assigns a virtual identification (ID) to each virtual machine in the virtualized environment. The processing core stores the virtual ID of the virtual machine in a special register. The mechanism also creates an entry for the virtual machine in a partition table. The mechanism may partition a shared cache using a vertical (way) partition and/or a horizontal partition. The entry in the partition table includes a vertical partition control and a horizontal partition control. For each cache access, the virtual machine passes the virtual ID along with the address to the shared cache. If the cache access results in a miss, the shared cache uses the partition table to select a victim cache line for replacement.

The mechanism of the illustrative embodiments does not require a change to the guest operating systems in the virtual machines. Furthermore, the mechanisms of the illustrative embodiments add very little complexity to the cache, because they do not require any changes to the cache arrays. The cache partition table is very small. For example, a 16-bit entry for each virtual machine (8 bits for vertical partitions and 8 bits for horizontal partitions) allows 128 partitions.

The cache partitioning by the mechanisms of the illustrative embodiments allows for flexible partitioning, allowing various degrees of sharing and privation. A line may go to multiple partitions. The illustrative embodiments may be orthogonal to many software-based cache coloring techniques.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from hulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in a data processing system, for partitioning a shared cache in virtualized environments, the method comprising:

assigning a virtual identifier to a virtual machine;
creating an entry for the virtual machine in a partition table, wherein the entry comprises a vertical partition control and a horizontal partition control;
receiving a cache access request from the virtual machine;
responsive to the cache access request resulting in a cache miss, overwriting one or more victim cache lines in the shared cache based on the vertical partition control and the horizontal partition control in the entry in the partition table corresponding to the virtual machine, wherein the vertical partition control represents one or more ways of the shared cache array assigned to the virtual machine and the horizontal partition control represents one or more rows of the shared cache array assigned to the virtual machine, wherein a virtual machine monitor creates the entry in the partition table to effect allocation of the one or more ways and the one or more rows of the shared cache to the virtual machine; and
wherein the vertical partition control comprises a bitmask and the horizontal partition control comprises a mask and an offset.

2. The method of claim 1, wherein the shared cache is an eight-way cache and wherein the bitmask is an 8-bit bitmask.

3. The method of claim 1, wherein the cache access request specifies an address comprising a tag, a partition identifier, a low index, and a line offset, and wherein overwriting the one or more victim cache lines in the shared cache based on the vertical partition control and the horizontal partition control in the entry in the partition table corresponding to the virtual machine comprises:
performing an AND operation of the mask and the partition identifier to form a result; and
adding the offset of the horizontal control to the result to form a pointer to a corresponding position within the address.

4. The method of claim 1, wherein a processor core of the virtual machine stores the virtual identifier.

5. The method of claim 4, wherein the cache access request comprises the virtual identifier.

6. The method of claim 1, wherein overwriting the one or more victim cache lines in the shared cache based on the vertical partition control and the horizontal partition control in the entry in the partition table corresponding to the virtual machine comprises:
selecting one or more rows of the shared cache based on the horizontal partition control;
selecting one or more ways of the one or more rows of the shared cache based on the vertical partition control.

7. The method of claim 6, wherein overwriting the one or more victim cache lines in the shared cache based on the vertical partition control and the horizontal partition control in the entry in the partition table corresponding to the virtual machine further comprises:
selecting one or more least recently used cache lines from the one or more ways to be replaced.

8. The method of claim 1, wherein assigning the virtual identifier to the virtual machine is performed by the virtual machine monitor.

* * * * *